Fig.1

May 3, 1932.   W. J. MILLER   1,856,498
CONVEYING MECHANISM
Filed June 30, 1927   4 Sheets-Sheet 3

INVENTOR:
William J. Miller
BY K. G. Doub,
ATTORNEY.

Patented May 3, 1932

1,856,498

UNITED STATES PATENT OFFICE

WILLIAM J. MILLER, OF SWISSVALE, PENNSYLVANIA

CONVEYING MECHANISM

Application filed June 30, 1927. Serial No. 202,629.

This invention relates to conveying mechanism, and an object of the same is to provide an improved form of conveyor of the flexible endless type embodying a predetermined amount of slack and traversing or moving adjacent a stationary frame having fabricating units mounted thereon, the conveyor as a whole being driven continuously from a suitable source of power and at the same time having the slack concentrated in sections thereof so that certain portions of the conveyor may be periodically or intermittently halted or rendered inert for fabricating operations while the slack is being distributed, the sections then being accelerated and moving forward as a part of the conveyor in regular order, thus eliminating the necessity of intermittent stopping and starting of the entire conveyor with consequent consumption of power spent in acceleration and retardation.

Another object of the invention is to provide a continuously driven conveyor of the endless type embodying a predetermined degree of distributed slack and means for isolating the slack and periodically or intermittently accumulating or concentrating the isolated slack in sections and subsequently re-distributing the concentrated slack, to thereby temporarily halt sections of the conveyor without affecting the continuous drive thereof.

A further object of the invention is to eliminate the necessity of providing means for imparting a step-by-step movement to an endless conveyor or clutch mechanism or a shiftable frame in the mechanism cooperating therewith or supporting the conveyor, and particularly where the conveyor is required to be comparatively long and heavy and support devices such as trays and molds which are required to be periodically and temporarily halted under or above or move adjacent fabricating or other units.

A further object of the invention is to construct a continuously driven conveyor of the type described, which may be intermittently arrested at certain positions, which conveyor can be adapted for use in pottery, plastic working, wood working, and other arts wherein articles or raw materials can be conveyed to the working tools.

Other objects and advantages of the invention will be apparent from a consideration of the drawings and description and appended claims.

For the purposes of illustration the invention is shown as applied to pottery fabricating mechanism of a type substantially in accordance with the structure disclosed by my copending application for patent for automatic jigger and mold conveyor combined, filed Jan. 6, 1927, Serial No. 159,395 which has become Patent No. 1,697,993. However, in my copending application just specified the fabricating units are mounted on a slidable frame in turn supported by a main frame so that they may move forward with the conveyor during a fabricating operation and then back again, while in the present instance the fabricating units are shown stationarily mounted on the main supporting frame, the present invention being utilized to provide for temporarily halting sections of the conveyor for fabricating operations on the molds without affecting the continuous drive of the conveyor, thereby saving power which would otherwise be spent in accelerating and retarding a slidable frame bearing the fabricating units.

The main stationary supporting frame for the conveyor and operating parts is generally indicated at 11 and is shown as having adjustably connected thereto as by screws 11$^b$ stationary jigger frames 89, which have slidably connected thereto vertically disposed, hollow reciprocating jigger spindles 12 by means of stationary vertical spindles 90, which telescope into and are in spline-sliding engagement with said jigger spindles 12, the latter having secured thereto horizontally-disposed friction gears 13, adapted to intermittently mesh with vertically disposed friction gears 14. The spindles 12 are shown as terminating at their upper ends in chucks 15, to intermittently raise molds 50 from pallets or carriers 16, adapted to be conveyed by a conveyor 17, the latter being actuated by continuously rotating sprockets to bring the pallets and molds into operative position under profiles 18 and under feeders and preformers 19, as will be hereinafter more fully described. A power shaft 20 is shown as horizontally mounted in pairs of bearings 21, 22 and 23, this shaft serving to primarily reciprocate the spindles 12 and impart motion to the conveyor 17, as will also be more fully hereinafter described. Rotary motion is imparted to the jigger spindles 12 with the molds 50 thereon by means of said gears 13 and 14, the latter being secured to shafts 91, which may be actuated independently of each other by suitable motors.

Figure 1:
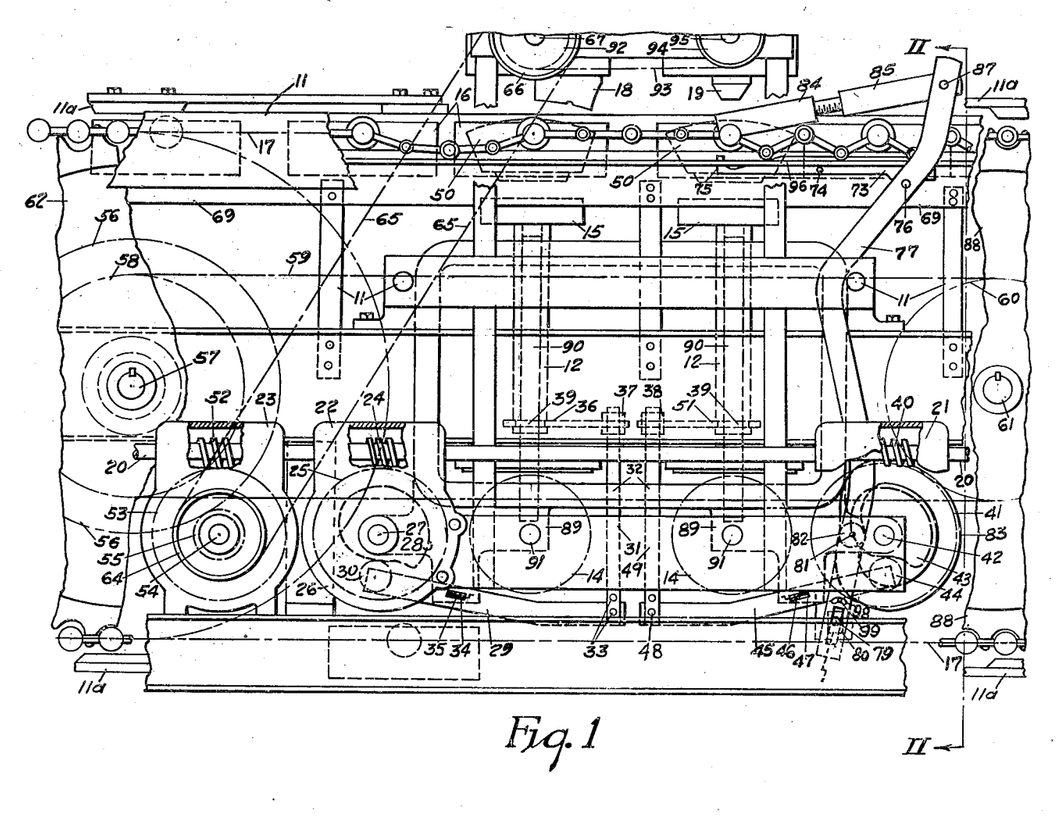
Figure 1 is a fragmentary view in side elevation of a conveyor embodying the features of the invention shown applied to a pottery fabricating machine.

A worm 24 is shown in Fig. 1 as positioned between the pair of bearings 22 and secured to the shaft 20 in mesh with a worm gear 25 which is enclosed by a housing 26, which is shown as secured to the frame 11 by means of suitable fastenings.

The gear 25 is secured to a shaft 27, which has adjustably secured thereto one or more cams 28 for actuating one or more levers 29, which have pivotally connected thereto at one end thereof rolls 30 in contact with the cams 28, and at the other end thereof by means of pivots 33 the lower ends of pitmen 31, which are slidably mounted in sockets 32 in the frame 11.

Each of the levers 29 is pivotally connected at 35 to a floating or shiftable pivot block 34, such as described in my copending application for patent for multiple and automatic jigger, filed Nov. 17, 1926, Serial No. 148,872 which has become Patent No. 1,757,132, and whereby the operative length of said levers 29 may be varied and adjusted while in operation.

Forked yokes 36 are adjustably secured at one end thereof to the upper ends of the pitmen 31 by means of nuts 37 and 38 and are in engagement with necks 39 on some of the jigger spindles 12, to periodically raise the same with some of the chucks 15 and molds 50 thereon into operative position under the profiles 18, substantially as described in my copending application for patent for mechanism for producing intermittent rotation of a jigger spindle, filed Feb. 5, 1927, Serial No. 166,180, which has become Patent No. 1,655,431.

Another worm 40 is secured to the shaft 20 and positioned between the pairs of bearings 21 in mesh with a worm gear 41, which is positioned in the same plane with the gear 25 and is indicated in Fig. 1 by its pitch circle in dot and dash lines.

The gear 41 is secured to a shaft 42, which has also adjustably secured thereto one or more cams 43, in contact with rolls 44, which are pivotally connected to one end of levers 45, which are shown in Fig. 1 as positioned symmetrically with said levers 29, and are likewise pivotally connected at 46 to floating pivot blocks 47, whereby the operative length of the levers 45 may be varied and adjusted.

The other ends of the levers 45 are pivotally connected at 48 to pitmen 49, which also pass through sockets 32 in the frame 11 and have adjustably secured thereto by means of nuts 37 and 38 one end of forked yokes 51, the other ends of which are in engagement with necks 39 of other of the jigger spindles 12, to periodically raise the latter with other of the chucks 15 and molds 50 thereon into operative position under said feeders and preformers 19.

A third worm 52 is secured to the shaft 20 and positioned between the pair of bearings 23, in mesh with a worm gear 53, which is positioned in the same plane with the gears 25 and 41, and is secured to a shaft 54. Shaft 54 has secured thereto a pinion 55, in mesh with a spur gear 56, which is secured to a shaft 57, the latter having secured thereto a sprocket 58, in mesh with a chain 59, which extends to another sprocket 60, which is secured to a shaft 61 and transmits thereto motion from the shaft 57. The latter serves to synchronize the rotation of sprockets 62 and 88 for the purpose of establishing and adjustably maintaining a predetermined amount of slack in the conveyor between the sprockets 62 and 88 for a purpose hereinafter more fully described.

Figure 9:
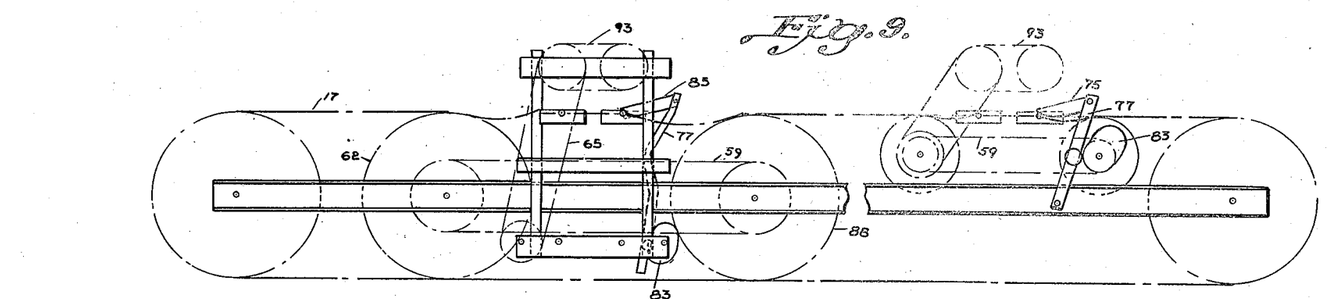
Fig. 9 is a diagrammatic side elevation of a conveyor, illustrating a number of different applications of the invention.

The shafts 57 and 61 have also secured thereto each a pair of sprockets 62 and 88 respectively, in mesh with the chains of the conveyor 17, which may extend as more fully shown in Fig. 9 through a considerable distance in a direction to the right of the sprockets 88 or to the left of the sprockets 62, and pass through suitable treating means (not shown), such as dryers, at the left of the sprockets 62, and preliminary treating means at the right of the sprockets 88.

The chains of the conveyor 17 have pivotally suspended therefrom by means of trunnions 63 the carriers 16, for conveying the molds 50 into position over the chucks 15 on the jigger spindles 12.

The center of gravity of each of the pallets or carriers 16 is below the level of the trunnions 63 thereof, whereby the pallets or carriers 16 are always maintained in a substantially horizontal position and with their centers of gravity in substantially the same vertical planes with their trunnions 63.

The shaft 54 has also secured thereto a sprocket 64, in mesh with a chain 65, which extends to and is in mesh with another sprocket 66, the latter being secured to an overhead spindle 67, which actuates a number of the profiles 18, preferably arranged in a line transversely to the conveyor 17.

The spindle 67 has also secured thereto a sprocket 92, operatively connected by means of a chain 93 to another sprocket 94, the latter being secured to another spindle 95, which preferably actuates a line of feeders and preformers 19, also arranged transversely to the conveyor 17.

The operation of the profiles 18 and feeders and preformers 19 by the spindles 67 and 95 respectively may be substantially as described in my copending application for patent for automatic jiggers and profiles filed Feb. 17, 1927, Serial No. 168,994, which has become Patent No. 1,762,236.

Additional sprockets similar to 92 may be employed with chains, similar to 93, thereon, to transmit motion to additional sprockets and spindles, similar to 94 and 95 respectively, to actuate one or more lines of fabricating units or tools which may be other than feeders and preformers or jiggers if desired.

Figure 2:
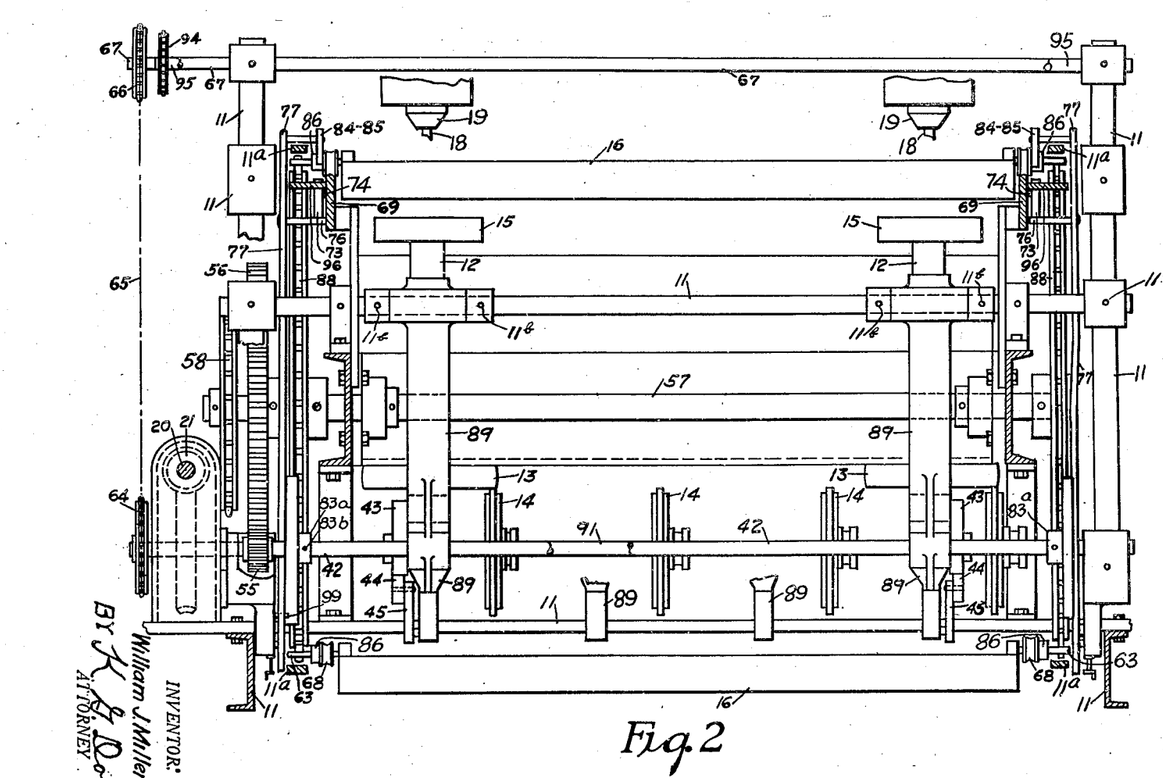
Fig. 2 is a section, partly broken away, taken on the line 2—2, Fig. 1.

The trunnions 63 have swiveled thereon sleeves 97, which have thereon grooved enlargements or heads 86, as shown in Fig. 2, for a purpose, which is hereinafter described. The sleeves 97, may have their ends secured to the ends of the carriers 16 in any suitable manner.

Rolls 68 are swivelled on the sleeves 97 and ride on a pair of rails 69, which are mounted on the frame 11, one on each side of the carriers 16.

Figure 3:
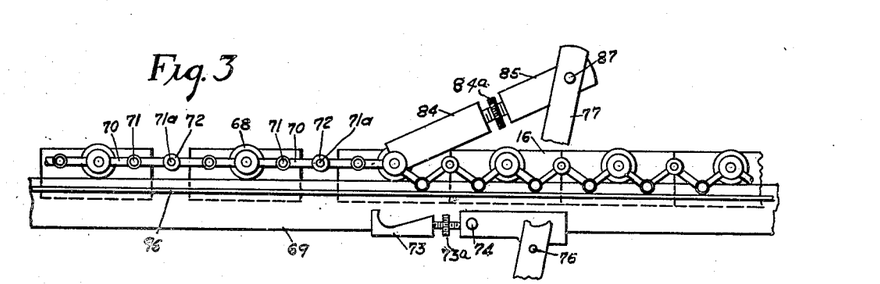
Fig. 3 is a fragmentary detail view in side elevation of a part of the conveyor showing one phase of operation.
Figure 4:
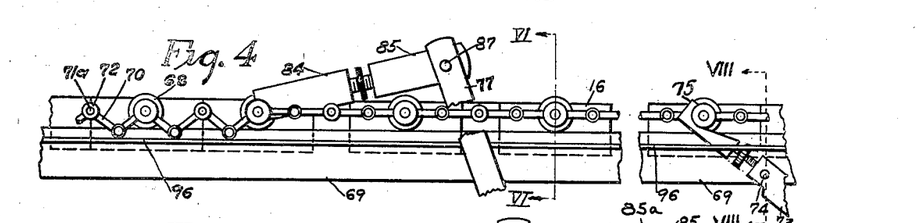
Fig. 4 is a similar view of a modification in structure in another phase of operation.
Figures 5, 6, 7:
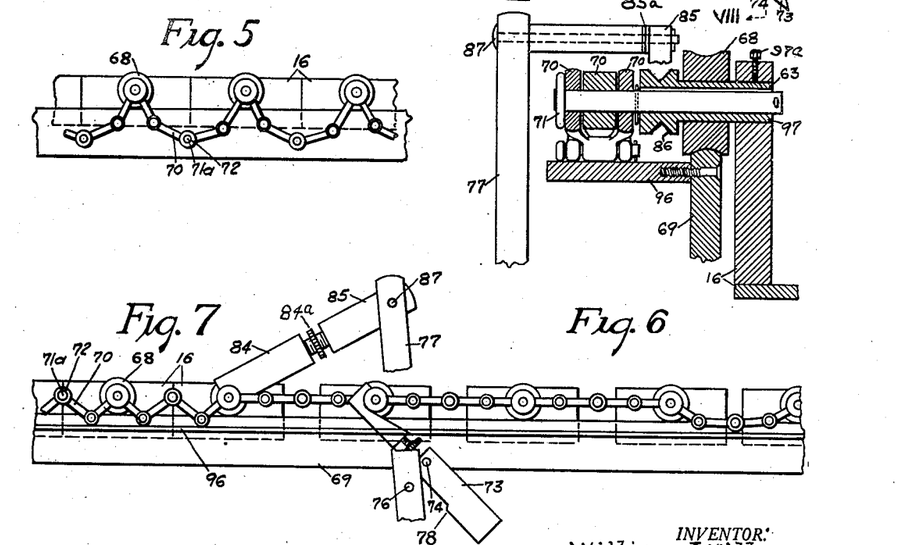
Fig. 5 is a similar view of a further slight modification in structure.
Fig. 6 is an enlarged detail sectional view on the line VI—VI, Fig. 4.
Fig. 7 is a view similar to Fig. 3, showing another phase of operation of the conveyor.

The chains of the conveyor 17 are shown in Figs. 3, 4 and 5 as having thereon each a group of links 70 between each consecutive two carriers 16. The links 70 are pivotally connected to each other by means of pins 71 and 71a intermediate of the trunnions 63; each middle pin 71a being preferably provided with one or more enlargements, such as a pair of washers or rolls 72, which cause the pins 71a to be initially raised in position above the level of the pins 71 on rails 96, when the links 70 are collapsed into a semipantographic shape, as is hereinafter more fully described, whereupon the pins 71 and 71a are lowered onto a pair of the rails 96, which may be placed thereunder, as shown in Figs. 3 and 4.

The enlargements 72 and the initial raising thereby of the pins 71a above the rail 96 are employed for a purpose which is hereinafter described.

The length of the chains of the conveyor 17 between the pair of sprockets 62 and the next pair of sprockets 88, to the right thereof, as shown in the drawings, is made excessive to allow a certain amount of slack thereon between the tops of the sprockets 62 and 88, for a purpose which is hereinafter described.

This slack may be utilized for periodically halting those of the carriers 16 which are situated over the chucks 15, the carriers being temporarily locked in position by means of the hook ends 75 of a pair of latches 73, adjustable as to length while the pivotal connection subsists or while in operation through the medium of screws 73ª, the carriers being thus temporarily halted and maintained in stable position without stopping the sprockets 62 and 88.

Figure 8:
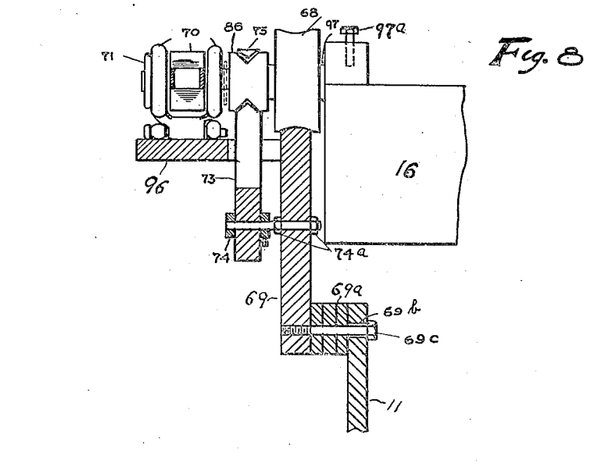
Fig. 8 is an enlarged sectional view on the line VIII—VIII, Fig. 4.

The latches 73 may be positioned in openings in the rails 96 and pivotally connected to the rails 69 at 74 and are so balanced as to have their hook ends 75 normally extending upwardly to intercept the grooved head 86 of the sleeves 97 on the trunnions 63 of the carriers 16 which pass over the hook ends 75 and keep the carriers stationary until the latches 73 are disengaged from the heads 86 by means of pins 76 carried by a pair of oscillating arms 77, hereinafter described, and cams 78 on the underside of the latches 73, adapted to be intermittently engaged by said pins 76. The hook ends 75 of the latches 73 may be given a V-shape substantially similar to the groove in the head 86, so that when the said hook ends engage the said heads, (see Fig. 8) the carriers or trays will be centered laterally at the operating point, or in the present instance when the chucks rise through the mold seats or recesses in the carriers. The latches 73 may be adjusted laterally while in operation or while the pivotal connection subsists through the medium of lock nuts 74ª on the pivot bolt 74, Fig. 8, and the tracks 69 may also be adjusted laterally as by interposing shims 69ª between the track and frame 11 and vertically as by enlarged openings 69ᵇ through which screw 69ᶜ passes. The sleeves 97 may be threaded through the carriers or trays 16 and thus provide independent lateral adjustment of said trays, a set screw 97ª extending into the carrier and abutting against said sleeves to maintain the latter in adjusted position. The enlarged heads 68 are preferably given lateral play as shown in Fig. 6, to permit the latches 73 to function as a centering means and also to ensure free running of the carriers at all points. If desired the rollers or heads 68 may also be made to function as a centering means for the carriers by eliminating the lateral play on the sleeves 97 and providing the contacting surfaces of the tracks 69 and the rollers or heads with V-shaped or analogous contours.

The arms 77 are pivotally connected at 79 to floating pivot blocks 80, such as described in my first-mentioned copending application, whereby the operative length of said arms may be varied and adjusted while in operation. A slot 98 is provided in each of the arms 77 substantially transversely thereto and a pin 99 inserted in the frame 11 to fit the slot 98, which may have any convenient outline, whereby the arms 77 are kept from falling down onto the blocks 80, which may be shifted in position lengthwise of the arms 77, a slight irregularity of motion being introduced by the outline of the slot 98 in the arms 77, which have pivotally connected thereto at 81 a pair of rolls 82, which are engaged by a pair of positive cams 83, adjustably mounted on the shaft 42 as by hubs 83ª and screws 83ᵇ, whereby the arms 77 are oscillated.

The arms 77 have pivotally connected thereto at the upper ends thereof by means of pins 87 a pair of adjustable pawls, which consist each of two parts, 84 and 85, adjustably connected as by means of thread-bolts and screws 84ª as shown, enabling adjustment as to length without disconnecting or while in operation. The pawls 84—85 may be adjusted laterally as by interposed shims 85ª, see Fig. 6. The oscillation of the arms 77 in a direction from left to right in Fig. 1 of the drawings causes the pins 76 on the arms 77 to engage the cams 78, thereby releasing the heads 86 of the sleeves 97 on the trunnions 63 from the hook-ends 75 on the latches 73, and the oscillation of the arms 77 in a direction from right to left causes the latches 73 to engage the heads. The continued motion of pawls 84—85 towards the left in Fig. 1 brings them with the carriers 16 and conveyor 17 from the position shown in Figs. 1 and 3 to the position shown in Fig. 7 of the drawings, or through a space equal to the distance between centers of two consecutive carriers 16 in Fig. 1.

The modification of part of the invention which is shown in Fig. 4 refers to a case wherein a number of jigger spindles 12 may be placed in series under a number of profiles 18 positioned over them in series, viz: in a line extending in the direction of travel of the conveyor, so that the material on the molds 50 of a line of carriers 16 may be shaped simultaneously, or where some other fabricating units or tools are arranged in series, to perform the same operation on the molds of a line of carriers at the same time. The pawls 84—85 may then be moved by the arms 77 through a space equal to the distance between the centers of the extreme carriers 16 of said line. This motion of the pawls 84—85 will cause the links 70 between the trunnions 63 of the carriers 16 of the conveyor 17 to be gathered up ahead of the said pawls, or to the left in Figs. 4 and 7 of the drawings, into a semipantographic form as shown in Figs. 4 and 7, where the chains of the conveyor 17 pass over the rails 96, and into the form of a catenary as in Fig. 5 where the links 70 are suspended in space. The rails 96 are provided with suitable openings for the locking latches 73 to pass therethrough.

The chains of the conveyor 17 in the rear of the pawls 84—85, or to the right in Figs. 4 and 7, may be either partly or entirely straightened out by the motion of the pawls 84—85.

By the above motion, the carrier 16 which is positioned under the line of profiles 18 transversely to the chains of the conveyor 17 is moved to the left in Figure 1 after the operation of shaping the material on the molds carried by this carrier has been completed by said profiles, and the next carrier 16 to the right which is positioned under said feeders and preformers 19 is moved into position under the profiles 18 after a charge of material has been fed to the molds on this carrier and preformed, and simultaneously another carrier with molds thereon is moved into position under the feeders and preformers 19. Thereupon the latches 73 are brought into action to engage the trunnions 63 of the carriers 16 by means of the hook ends 75 on the latches 73 and the heads 86 of the sleeves 97 on the trunnions 63 and hold the carriers 16 under the profiles 18 and feeders and preformers 19 while the pawls 84—85 are moved through the greater part of their return stroke by the oscillation of the arms 77 in a direction from left to right in Fig. 1.

The part of the chain of the conveyor 17 with the links 70 thereon which is situated to the left of the profiles 18 in Fig. 1 has its slack gradually taken out of it by the continuous pulling action of the sprockets 62 at the left hand end of Fig. 1 and may be brought to a substantially straight shape as shown in Fig. 3, and at the same time that part of the conveyor chain 17 which is situated to the right of the preformers and feeders is gradually gathered up into a semipantographic shape as shown in Fig. 3 by the action of the sprockets 88 situated at the right hand end of Fig. 1, until the arm 77 with the pawls 84—85 are oscillated to the left again, when the operation is repeated.

By the above means a periodical or intermittent motion is imparted to some of the carriers 16 with the molds thereon while the other carriers 16 and sprockets 62 and 88 which actuate the chains of the conveyor 17 have a continuous and substantially uniform motion.

The section of the chains of the conveyor 17 which is connected to those of the pallets or carriers 16 which have a periodical or intermittent motion may be very small as compared with the total length of the conveyor and the chains thereof, the greater part of which have a uniform motion and whereby power and time is saved as will be readily apparent.

Means for retaining the conveyor chains in mesh with the sprockets may be provided in the form of tapered blocks 11ª suitably secured to the frame 11.

As hereinbefore specified, the jigger frames 89 are stationarily mounted on the main frame 11 as well as the supporting means or frames for the feeders and preformers and profiles, and material may be fed to the molds and preformed and shaped, the molds and carriers being temporarily halted under the fabricating units for these operations without interfering with the continuous drive of the sprockets.

The point at which the motion of the various parts of the mechanism takes place may be accurately determined by the sundry adjustments heretofore described.

Instead of the shaft 57 being the driving shaft of the conveyor and the shaft 61 the driven shaft, this relation may be reversed, in which event the sprocket 88 may be made the driving sprocket of the conveyor chain 17 instead of the sprocket 62 and the chain 59 with the sprockets 58 and 60 omitted and suitable means provided to keep the lower part of the conveyor from unduly sagging and pulling on the sprocket 62 such as a track or idler sprockets under the lower part of the chain, or a brake or other means applied to the sprocket 62 to prevent overrunning of the same, or a means may be provided for taking up the slack of the lower part of the chain if desired.

In the present instance the pallets serve as a means, in addition to carrying the molds 50, for operatively connecting the parallel chains of the conveyor, and it is obvious that these pallets could be replaced by buckets or any other form of device used in connection with flexible conveyors, and furthermore, flexible members other than chains could be employed as well as any desired form of motion-transmitting means other than the sprockets, the latter being shown simply to illustrate a driving means for the conveyor. Other means than the latches 73 may be used for holding the pallets 16 inert as well as other means than the pawls 84—85 for moving said pallets, these devices simply being shown in the present instance for the purposes of illustration. It is also obvious that the conveyor could be mounted on motion-transmitting means such as the sprockets herein referred to having either a horizontal or vertical axis without departing from the scope of the invention.

From the foregoing description, the operation of the conveying mechanism should be readily understood, and, briefly, may be generally outlined as follows:

Power may be primarily applied to the shaft 20 through the medium of a suitable motor or the like, rotary motion, vertical reciprocation and lateral reciprocation, respectively, being transmitted by this shaft through the worms 52, 24 and 40 and gears 53, 25 and 41, respectively, to the driving sprocket 62; spindles 90 and 12 and chucks 15 through cams 28, 43, levers 29, 45, pitmen 31, 49 and cross forks 36, 51; and arms 77 through cams 83. Rotation of the sprocket 62 causes the conveyor 17 to function or move, and this movement may be continuous, said conveyor being so mounted as to provide a predetermined degree of distributed slack between the sprockets 62 and 88. The latch 73 may be disposed to function in a manner heretofore clearly described to temporarily hold such sections of the conveyor inert as may be desired while the chucks are being reciprocated to raise the molds from the pallets for fabricating operations, and during this time the slack is being accumulated in rear of said inert section or sections.

The halted sections may be started in motion by the levers 77 or by the combined effort of the levers and drive sprockets or by the drive sprockets alone, depending upon the adjustment of the working stroke of said levers. For instance, the working stroke of the levers may be adjusted to advance a section at an accelerated speed and accumulate the slack in front of the said section and the latter remain inert until the continuous drive of the conveyor absorbs the slack and carries the section forward, or the stroke of the levers 77 may be adjusted to advance the sections and accumulate a portion of the total slack, and before the accumulated slack is absorbed, again act to move the inert section forward independently of the drive of the conveyor, or the stroke of the levers may be synchronized with the drive of the conveyor so as to advance the sections and the succeeding strokes move the inert sections simultaneously with the absorption of the slack by the drive of the conveyor and thus cooperate with the latter in moving the inert sections. The inert sections may also in some instances be started in motion by the carriers and links crowding together in rear thereof and which may also combine with the levers and drive sprockets in starting the inert sections forward.

However, no attempt is made herein to set forth the various advantageous adjustments and operations that may be obtained by the improved conveying mechanism and it will be understood that the invention is not limited in this respect. It should also be borne in mind that the sprockets or rotary elements 62 and 88 are simply shown mounted at opposite extremities of the frame to illustrate one application of the conveying mechanism, and in many instances it may be desired to employ a plurality of rotary elements or pairs of the latter spaced suitable distances apart along the length of one continuous conveyor.

Fig. 9 illustrates diagrammatically a multiple of slack isolating units applied to one continuous conveyor or the halting of sections of the conveyor along any portion of the length thereof. The smaller unit illustrates a method of utilizing slack along the upper and lower or both the upper and lower lengths of the conveyor, it being obvious that any number of these units could be applied in accordance with the length of the conveyor and along the lower lengths of the flexible elements as well as the upper lengths thereof within the scope of the invention, the rotary elements or sprockets in this instance engaging the conveyor at one length only. The conveyor may be primarily driven from any of the rotary elements. By this means the slack may be isolated in sections and restricted to said sections and maintained constant therein.

It is obvious that the conveyor mechanism previously described may be utilized in arts other than the manufacture of pottery. For example the carriers 16 may be replaced by buckets, molds, grippers, receptacles, or any other mechanisms for holding the article or raw material to be subjected to the working tool.

What is claimed as new is:

1. A conveyor comprising spaced rotatable elements, normally taut endless flexible members positively engaged by said rotatable elements, carriers mounted in series in said endless flexible members, said members being initially provided with slack sections between said elements and the latter rotated in synchronism to confine the slack to said sections while the remaining portion of said flexible members remains taut, and a supplemental intermittent drive means for advancing the carriers in the slack sections of said flexible members at a speed in excess of the remaining carriers.

2. A conveyor comprising one or more pairs of spaced sprockets, an endless chain positively engaged by said sprockets, carriers mounted in series in said chain, said chain being initially provided with slack sections between said sprockets and the latter rotated in synchronism to confine the slack to said sections while the remaining portion of the chain remains taut, and means operating between said sprockets for advancing certain of the carriers at a speed in excess of the remaining carriers.

3. A conveyor comprising endless flexible members, rotatable elements which positively engage said flexible members, said elements being continuously driven in synchronism and spaced a limited distance apart to provide a predetermined amount of slack in said members between said elements, and a means operating longitudinally of the flexible members between said elements for periodically advancing one or more sections of said flexible members at a speed in excess of the remaining portion thereof to concentrate the slack and thus permit certain portions of said members to remain inert while the slack is being constantly distributed by the continuous drive of said elements.

4. A conveyor comprising endless flexible members, rotatable elements which positively engage said flexible members, said elements being spaced a certain distance apart to provide a predetermined amount of slack in said flexible members therebetween and continuously rotated in synchronism to isolate the slack in sections while the remaining portion of said flexible members remains taut, and a supplemental intermittent driving means mounted to act on one or more sections of said flexible members between said elements for periodically advancing said sections at a speed in excess of the normal travel of said flexible members.

5. A conveyor comprising endless flexible members having carriers mounted in series therein, said flexible members being positively engaged by rotatable elements spaced a predetermined distance apart to provide a predetermined amount of slack therebetween and continuously rotated in synchronism to maintain the amount of slack constant, and means operating longitudinally of said flexible members between said elements for advancing one or more of said carriers at a speed in excess of the normal drive of said elements to concentrate the slack and thereby permit certain of the carriers to remain inert for fabricating operations while the slack is being distributed by the continuously driven elements.

6. A conveyor comprising endless flexible members having carriers mounted in series therein, said flexible members being positively engaged by rotatable elements spaced a predetermined distance apart to provide a predetermined amount of slack therebetween and continuously driven in synchronism to maintain the amount of slack constant, a supporting track between said elements over which said carriers have movement, and means acting longitudinally of said flexible members between said elements for periodically advancing one or more of said carriers at a speed in excess of the normal travel of the remainder of said carriers to concentrate the slack and thereby permit certain of the carriers to remain inert while the slack is being distributed by the continuously driven elements.

7. A conveyor comprising endless flexible members having carriers mounted in series therein, said flexible members being positively engaged by rotatable elements spaced a predetermined distance apart to provide a predetermined amount of slack therebetween and continuously rotated in synchronism to maintain the slack constant, and cam and lever means acting longitudinally of said flexible members between said elements for periodically advancing one or more of said carriers at a speed in excess of the remainder of said carriers to concentrate the slack and thereby permit certain of the carriers to remain inert while the slack is being distributed by the continuously rotating elements.

8. A conveyor comprising endless flexible members having carriers mounted in series therein, said flexible members being positively engaged by rotatable elements spaced a predetermined distance apart to provide a predetermined amount of slack therebetween and continuously driven in synchronism to maintain the amount of slack constant, means for periodically advancing one or more of said carriers at a speed in excess of the remainder of said carriers to concentrate the slack and thereby permit certain of the carriers to remain inert while the slack is being distributed by the continuously driven elements, and means for automatically alternately gripping and releasing the inert carriers during concentration and distribution of the slack.

9. A conveyor comprising spaced rotatable elements, normally taut endless flexible members positively engaged by said rotatable elements, carriers mounted in series in said endless flexible members, said members being initially provided with slack sections between said elements and the latter rotated in synchronism to confine the slack to said sections while the remaining portion of said flexible members remains taut, a supplemental intermittent drive means for advancing the carriers in the slack sections of said flexible members at a speed in excess of the remaining carriers to permit said carriers to remain temporarily at rest for a fabricating operation, and means for locking said carriers in the position of rest.

10. A conveyor comprising spaced rotatable elements, normally taut endless flexible members positively engaged by said rotatable elements, carriers mounted in series in said endless flexible members, said members being initially provided with slack sections between said elements and the latter rotated in synchronism to confine the slack to said sections while the remaining portion of said flexible members remains taut, a supplemental intermittent drive means for advancing the carriers in the slack sections of said flexible members at a speed in excess of the remaining carriers to permit said carriers to remain temporarily at rest for a fabricating operation, means for locking said carriers in the position of rest, and means for releasing said locking means.

11. A conveyor comprising endless flexible members having carriers mounted in series therein, said flexible members being positively engaged by rotatable elements spaced a predetermined distance apart to provide a predetermined amount of slack therebetween and continuously driven in synchronism to maintain the amount of slack constant, means for periodically advancing a definite number of said carriers at a speed in excess of the remainder of said carriers to concentrate the slack and thereby permit certain of the carriers to remain inert while the slack is being distributed by the continuously driven elements, means for automatically gripping the inert carriers to hold them in stable position, and means operating in conjunction with said carrier-advancing means for automatically releasing said gripping means.

12. A conveyor comprising endless flexible members having carriers mounted in series therein, said flexible members being positively engaged by rotatable elements spaced a predetermined distance apart to provide a predetermined amount of slack therebetween and continuously driven in synchronism to maintain the amount of slack constant, means for periodically advancing a definite number of said carriers at a speed in excess of the remainder of said carriers to concentrate the slack and thereby permit certain of the carriers to remain inert while the slack is being distributed by the continuously driven elements, automatically acting latches for gripping the inert carriers to hold them in stable position, and latch-release members associated with said carrier-advancing means.

13. A conveyor comprising endless flexible members having carriers mounted in series therein, said flexible members being positively engaged by rotatable elements spaced a predetermined distance apart to provide a predetermined amount of slack therebetween and rotated in synchronism to maintain the slack constant, and a means for isolating the slack in sections between said rotatable elements.

14. A conveyor comprising endless flexible members having carriers mounted in series therein, said flexible members being positively engaged by rotatable elements spaced a predetermined distance apart to provide a predetermined amount of slack therebetween and rotated in synchronism to maintain the slack constant, means for isolating the slack in sections, and carrier-advancing means mounted to operate adjacent said isolated sections.

15. A conveyor comprising spaced rotatable elements, normally taut endless flexible members positively engaged by said rotatable elements, carriers mounted in series in said endless flexible members, said members being initially provided with slack sections between said elements and the latter rotated in synchronism to confine the slack to said sections while the remaining portion of said flexible members remains taut, a supplemental intermittent drive means for advancing the carriers in the slack sections of said flexible members at a speed in excess of the remaining carriers, and means for supporting said carriers while in said slack sections.

16. A conveyor comprising one or more pairs of spaced sprockets, an endless chain positively engaged by said sprockets, carriers mounted in series in said chain, said chain being initially provided with slack between the sprockets and the latter rotated in synchronism to confine the slack to that portion of the chain traveling between said sprockets while the remaining portion of the chain remains taut, means operating between said sprockets for advancing certain of the carriers at a speed in excess of the remaining carriers, and a track for supporting the carriers while traveling in the slack portion of the chain.

17. A conveyor comprising spaced rotatable elements, endless flexible members engaged by said rotatable elements, carriers mounted in series in said endless flexible members, said members being initially provided with slack sections between said elements and the latter rotated in synchronism to confine the slack to said sections while the remaining portion of said flexible members remains taut, means for intermittently advancing certain of the carriers between said elements at a speed in excess of the remaining carriers, and means for adjusting the intermittent advance of said carriers.

18. A conveyor comprising spaced rotatable elements, normally taut endless flexible members positively engaged by said rotatable elements, carriers mounted in series in said endless flexible members, said members being initially provided with slack sections between said elements and the latter rotated in synchronism to confine the slack to said sections while the remaining portion of said flexible members remains taut, a supplemental intermittent drive means for advancing the carriers in the slack sections of said flexible members at a speed in excess of the remaining carriers to permit said carriers to remain temporarily at rest for a fabricating operation, and means for adjusting the position of rest of said carriers.

Signed by me this 29th day of June, 1927.

WILLIAM J. MILLER.